June 7, 1955
A. A. BUEN
2,709,958
APPARATUS FOR THE TREATMENT OF GRASS
AND PLANTS TO PRODUCE SILAGE
Filed May 8, 1952
2 Sheets-Sheet 1
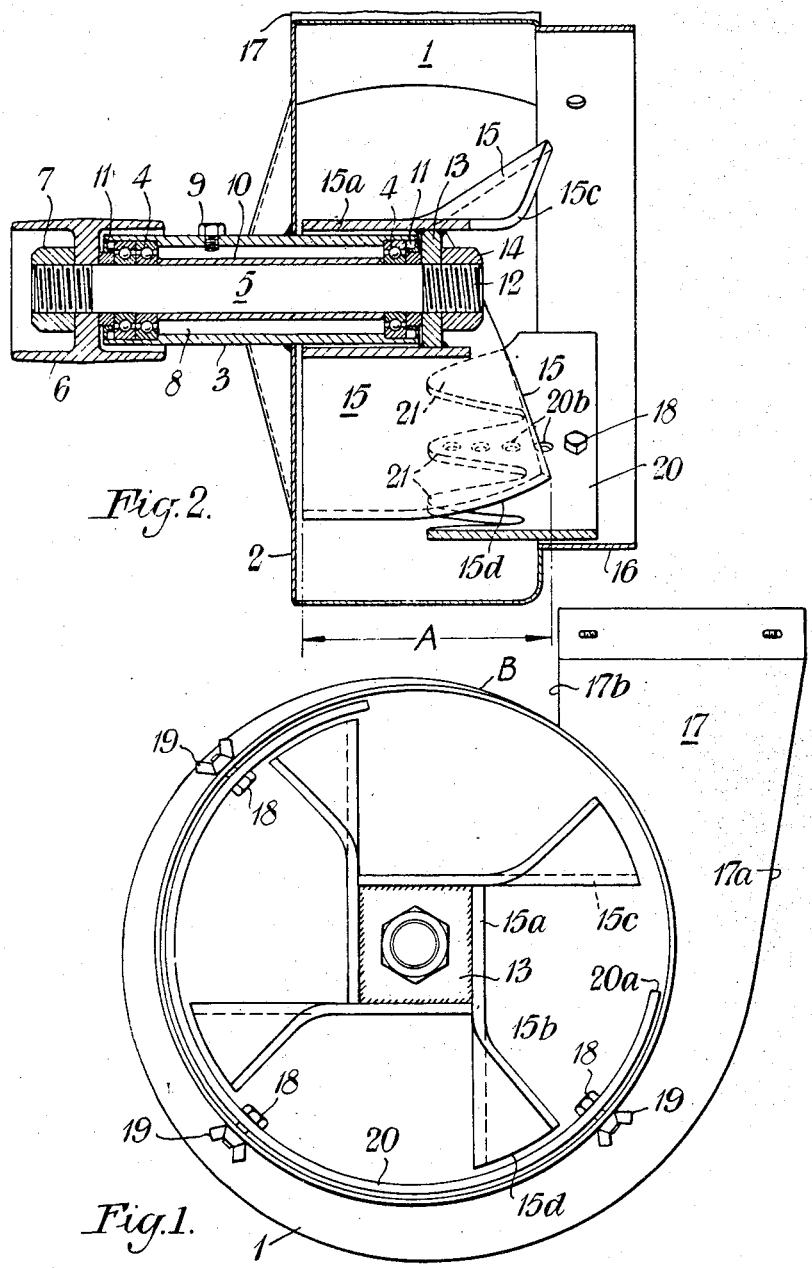
Inventor
Anders Asmundsen Buen
By:
Haseltine, Lake & Co.
Agents June 7, 1955   A. A. BUEN   2,709,958
APPARATUS FOR THE TREATMENT OF GRASS
AND PLANTS TO PRODUCE SILAGE
Filed May 8, 1952   2 Sheets-Sheet 2

INVENTOR
ANDERS ASMUNDSEN BUEN
BY Haseltine, Lake & Co.
AGENTS

2,709,958

APPARATUS FOR THE TREATMENT OF GRASS AND PLANTS TO PRODUCE SILAGE

Anders Asmundsen Buen, Ovre Jondalen, near Konsberg, Norway, assignor to Pullman (Patent) Products Limited, London, England Application May 8, 1952, Serial No. 286,770

Claims priority, application Great Britain May 11, 1951

8 Claims. (Cl. 100—144)

This invention relates to apparatus for pretreating green crops before loading them into a silo, and also for breaking up, lacerating or likewise treating all grasses, legumes, kale, maize, beet-tops, arable crops and roots. Of particular interest to farmers, it is possible by means of the present invention to subject grass or the like fodder to an impact action to crush the grass or the like to an extent which will remove the normal or inherent resilience of the strands of grass or the like to release, without loss thereof, its juice content without breaking up the grass or the like into small particles, whereby the individual strands of grass or the like are substantially flattened and opened out to enable them to coagulate in a silo or pit and to be built up in the silo or pit in a mass retaining the juices and other constituents having the most nutriment value for cattle whilst obviating the looseness of the mass which is the cause of air pockets. That is to say by means of apparatus according to the present invention the treated fodder in the mass within the silo or the like is substantially wholly de-aerated with the exclusion of harmful gases, and in most cases particularly with grasses which have not been dried off to a "hay" condition the ensilage yields a fodder with a bright green colour and a very mild and pleasant odour and highly nourishing. Apparatus for this purpose has been proposed heretofore in which a substantially cylindrical casing accommodates two rotors one of which is constructed and adapted to operate as a beater and the other as a fan for creating an induced draught whereby the grass is drawn at high velocity into the casing and caused to pass between the rotary beater and the casing where it is reduced to the desired flattened state and by reason of the combination of the effects of the direction of draught set up by the fan and the direction of rotation of the beater to pass at high velocity through an outlet in the periphery of the casing to enable it to be collected and transported, preferably with as little delay as possible, to the silo, or if desired the said outlet can be fitted with a discharge conduit having an outlet shaped as to direct the treated grass or the like into the silo. In the previously proposed apparatus the beater and fan in one form are on separate shafts journalled in bearings spaced apart and driven by belt pulley or other suitable means from any suitable prime mover such as e. g. the power unit of a land tractor, whilst in another previously proposed form the fan and beater are separate integers mounted one behind the other on a common shaft, the latter form of the previously proposed apparatus having the advantage that a smaller casing is possible.

Other apparatus for treating grass and the like have also been proposed heretofore in which the grass or the like is subjected to an impact action by means of rotary beaters, one known apparatus comprising one or more spiders or sets of radiating arms carried by one or more shafts and carrying hard rubber hammer heads which in co-operation with conveying means beat the grass, this apparatus however proving undesirably expensive having regard to the requirements of agricultural work and also removing too much of the valuable juices from the grass or the like or breaking up the grass into too short particles which is objectionable from the point of view of the health of cattle. Still further it has been proposed heretofore to feed grass or the like between rollers or endless belts subjected to pressure which will extract practically all moisture from the grass so that the product is of a dry pliable form similar to hay.

The first mentioned combination of rotary fan and beater disposed alongside each other or on a common shaft comprise apparatus which have proved successful in the production of good quality silage, but arising from experiments it has been discovered that with freshly cut grass and the like, which is preferred in the use of the present invention, the processing time of the grass should be kept as short as possible so as to retain as much as possible of the valuable juices in free intimate association with the flattened or crushed strands of grass or the like. Also, various types of grasses and also various local conditions make it desirable for the farmer to be able readily to vary the effective beating action on the grass or the like whilst maintaining a high rate of treatment. In the aforesaid apparatus including the combination of a rotary beater and fan the beater and fan whilst performing their individual operations have relatively fixed speeds and the grass has to pass from the ambient zone of one member to the ambient zone of the other member before being discharged from the casing. Thus, whilst it is possible by merely varying the speed of rotation imparted to the fan and beater to vary the relative velocities of the grass into and out from the casing there still remains the fact that the grass or the like has to negotiate the said two ambient zones whilst the speed ratio of the fan and beater is fixed. Hence, it does not always follow that the speed of rotation of the beater is properly attuned to the velocity of the grass or the like which is subjected to a beating action between the beater and the casing owing to the differential which is introduced by reason of quantity of grass and the like drawn into the apparatus over a predetermined period by the fan bearing in mind that at different times of the year and at different places the physical characteristics of the grass or the like change and the velocity at which the grass or the like is fed to the beater is not necessarily a constant in relation to the speed of the fan. Also, it is believed that as far as reasonably possible the strands of grass or the like should be kept flowing in their lengthwise direction in the ambient zone of the beater so as to crush the strands of grass as far as reasonably possible uniformly continuously throughout their length in a manner which enables the speed of the beater to always be related properly to the velocity of the grass or the like set up by the induced draught of the fan. Still further, it is desirable to keep the apparatus to sturdy and simple form with the minimum number of separate integers within the housing in which the material is treated and further to enable auxiliary appliances to be adapted readily to the apparatus. These desiderata are achievable by means of the present invention.

According to the present invention apparatus for treating fodder or the like is of the type in which a rotor adapted to serve as a beater rotates within a substantially cylindrical housing into which material to be treated is induced by forced draught creating means located within the housing, and is characterised in that the rotor serving as a beater is constructed and shaped to act as a fan to create the said forced draught and has free edges remote from its axis of rotation between which and a beating surface within the housing the material is subjected to a beating action the housing having in its periphery juxtaposition to the circular track generated by the moving beater and fan an outlet for the discharge of the beaten material from the housing.

By means of the present invention the grass or the like is subjected to a violent beating action lengthwise along the strands of grass or the like in a substantially uniform manner by feeding the grass or the like directly to the beating means and discharging it from the casing directly by the influence of the beating means by forming the beating means as a plurality of blades carried by a shaft, the blades of the beater itself being deformed to set up the induced draught to draw the untreated grass or the like at high velocity into the casing, the casing comprising a cylindrical body part disposed ambiently of the outer circular tracks of movement generated by the blades and including a beating surface adjustable towards and away from such tracks.

In order that the invention may be clearly understood and readily carried into effect drawings are appended hereto illustrating embodiments thereof, and wherein, Figure 1 is a front elevation showing the combined beater and forced draught creating apparatus detached from its support.

Figure 2 is a sectional side elevation of Figure 1.

Figure 3:
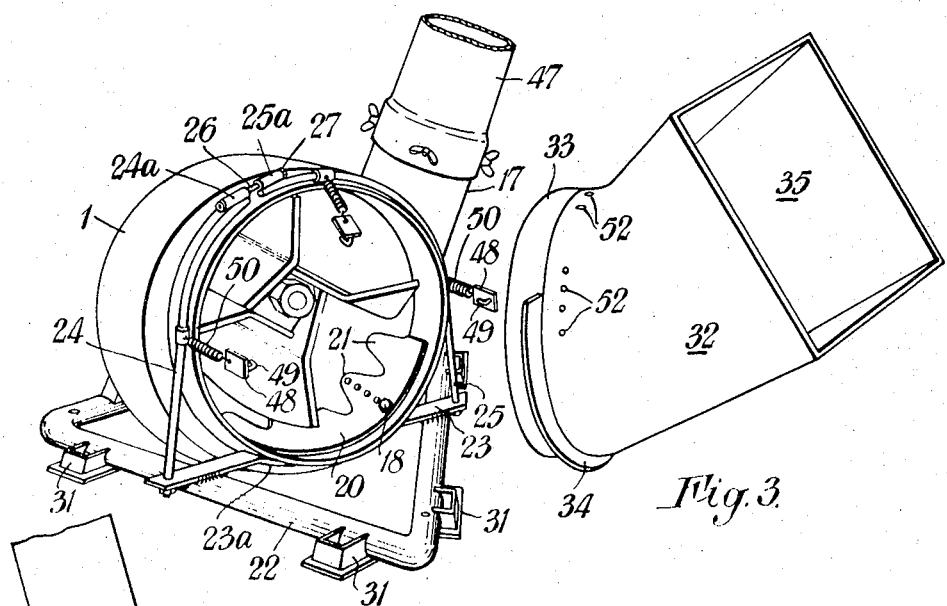
Figure 3 is a perspective front elevation view showing the machine mounted on a base frame and with an associated hopper detached therefrom.
Figure 5:
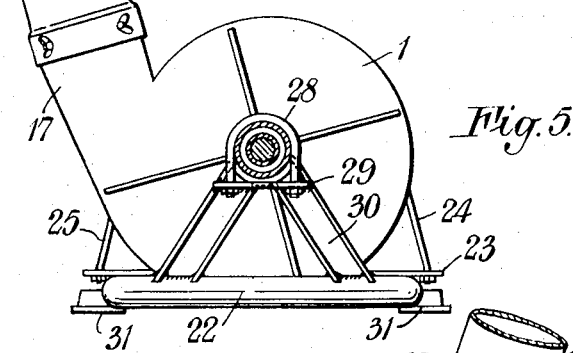
Figure 5 is a front perspective view showing the apparatus with an adapter attached thereto for use in the breaking up of kale and like crops, a hopper suitable for this purpose being shown detached from the said apparatus.

Referring to the drawings, the apparatus comprises a sheet metal nearly cylindrical casing 1 open at one side and closed at the other side, the closed side 2 receiving a relatively fixed sleeve 3 extending in the axial direction for a part of the depth of the casing and also rearwardly and accommodating within its fore-and-aft ends journal bearings 4 for a concentric shaft 5 to the rear end of which is affixed beyond the said sleeve a pulley 6 adapted to be driven by a belt from a fly wheel of a land tractor or other suitable source of power, a lock nut 7 being threaded on to the rear end of the shaft and abutting against the concentric annular part of the pulley. The annular space 8 between the sleeve and shaft can be filled with grease through a greasing or lubricating hole normally sealed by a hexagonal headed screw 9 or by a lubricator, and a distance piece tube 10 can be fitted about the shaft and extend between the two end sets of journal bearings, oil seal rings 11 being interposed between the journal bearings and the ends of the said sleeve preferably in conjunction with seal collars fitted on the appropriate parts of the shaft.

The forward end of the shaft 5 is threaded as at 12 and has fixed thereon a rectangular collar 13 by means of a nut 14 threaded on to this end of the shaft, and to the four sides of this collar are welded four blades 15 comprising a combined fan and beater. Each blade 15 has a fore-and-aft dimension "A" (see Figure 2) substantially equal to the axial dimension of the cylindrical casing and is formed with a flat portion 15a lying along the appropriate side of the rectangular collar 13 and welded thereto, the width "A" of each blade at its free end being greater than at its inner end by forwardly inclining the front edge 15b of each blade, and each blade is deformed by bending it through an angle of about 30° along a line 15c substantially coplanar with the appropriate side of the collar 13 to which the blade is welded, this deformation imparting a form of pitch to each blade, and the deformed parts being radiused at its free edge as at 15d so that throughout the whole radius thereof the blades are equidistantly spaced from the axis of the shaft 5.

The front wall of the casing has a forwardly directed ring-like inlet mouth part 16 concentric with the shaft 5 and into which mouth part the grass or the like is drawn by the induced draught set up by the combined fan and beater. This forwardly directed mouth part 16 is eccentric with respect to the casing 1, the periphery of the casing merging at about the point B (see Figure 1) into the radius of the ring 16 and therefrom progressively increasing in radius until it merges into one side 17a of a discharge outlet 17 projecting upwardly from the casing, the opposite side 17b of this outlet joining the smallest radius part B of the curved periphery of the casing, so that the casing takes the form frequently adopted for a "cyclone" type of blower. Thus, by reason of the inclination of the side 17a of the outlet 17 a somewhat flared increase in area of outlet from the casing is provided.

In the said forwardly directed extension 16 of the casing there is secured by three or other suitable number of bolts 18 fitted with wing nuts 19, an arcuate beater or crushing plate 20 projecting forwardly within the casing 1 to nearly half the depth of the casing and having its inner arcuate surface close to the outer track generated by the said blades 15, it being understood that the edges 15d of the blades when opposed to the plate 20 are parallel therewith. This plate can extend around the interior of the casing for about 240° but may be less. By adjusting the end 20a (see Figure 1) of the plate 20 towards the outlet 17 this has the effect of holding the material in the machine for a longer period than if the end 20a is adjusted away from the outlet, it being understood that the combined fan and beater rotates in the counter-clockwise direction looking at Figure 1.

The said beater or crushing plate 20 for substantially the whole of the depth which projects within the casing is shaped as a plurality of teeth 21 by forming deep notches in the plate, the depth of these notches and teeth being nearly or substantially equal to the maximum width of the deformed or curved parts 15d of the beater blades.

The plate 20 has sufficient flexibility to enable it to be deformed slightly if adjusted towards or away from the beater blades by appropriate actuation of the said bolts 18 and nuts 19. Also, in addition to adjusting it about the axis of the machine the plate 20 is adjustable axially, i. e. into and away from the housing by selecting, for the reception of the bolts 18, holes 20b arranged in axially directed lines in the plate 20. The axial adjustability of the plate 20 is useful in compensating for various classes of fodder producing materials to be treated.

By means of the present invention the grass or the like induced by a forced draught within the casing is caused to pass directly between the beater blades 15 and the said plate 20 and consequently to assume positions in which they extend lengthwise around the ambient space between the rotary beater and the casing so as to become adequately crushed and operated upon at a speed directly proportional to the velocity at which the grass or the like passes into and out from the casing. Hence, it is a simple matter to effect slight adjustments in the speed of rotation of the combined fan and beater to obtain the most efficient results when treating the grass, it being understood that variations in this speed are simply effected by adjusting the engine of the land tractor or the like driving the apparatus.

A convenient form of base for the support of the aforesaid machine comprises a triangular frame 22 composed of tubular section bars forming an equilateral triangle and upon which the casing 1 is supported substantially symmetrically by resting its forward part upon a transverse bar 23 fixed across two sides of the triangular base and having a downwardly bowed part 23a to accommodate the base of the housing 1. The securing of the casing is effected by engaging about the forwardly projecting mouth part 16 the bowed upper ends of two vertical rods 24 and 25 with their ends nearly brought together and formed with sleeves or bosses 24a and 25a through which is passed a bolt 26 having a nut 27 threaded on one end thereof so as to tension the members 24 and 25 about substantially the upper half diameter of the mouth part 16 of the machine.

The rear of the housing 1 is secured to the base frame 22 by an inverted U-shaped stirrup member 28 engaged by its bend over the sleeve 3 containing the bearings for the shaft 5, the ends of the U bolt being passed through a lug or lugs 29 integral with an inverted V-shaped channel section bracket 30 secured by bolts or otherwise fixedly united to the base frame, the sleeve 3 nesting in the top of the bracket 30. Thus, it becomes a simple operation to remove from and replace to the base frame the housing 1, whilst the triangular support affords by reason of its three corners firm support for the machine even upon un-level ground, additional security being obtainable by driving stakes or spikes through guides 31 welded or otherwise secured to the outer faces of the base frame.

The material to be subjected to the beating action by the blades 15 and projected thereby through the outlet 17 can be fed, by reason of the draught induced by the rotating set of blades 15, directly into the housing 1, but it is preferred to feed it into the housing by fitting into the mouth constituted by the ring 16 a hopper 32 such as shown by way of example in Figure 3. This hopper has a cylindrical neck 33 to plug into the mouth 16 and a flange 34 to abut against the rim of the mouth 16 to locate the hopper neck 33 axially relative to the mouth. The hopper is flared upwardly away from its neck 33 into the hopper mouth 35 so that grass or the like can be fed downwardly into the apparatus to be acted upon between the free edges of the blades 15 and the arcuate plate 20. Plates 48 with hooks 49 are connected by coiled tension springs 50 to collars 51 on the rods 24 and 25, the hooks 49 engaging selectively in sets of holes 52 in the hopper to anchor the hopper in position and to enable it to be adjusted angularly about the axis of the housing so that the mouth 35 of the hopper can be adjusted positionally relative to the housing.

Figure 4:
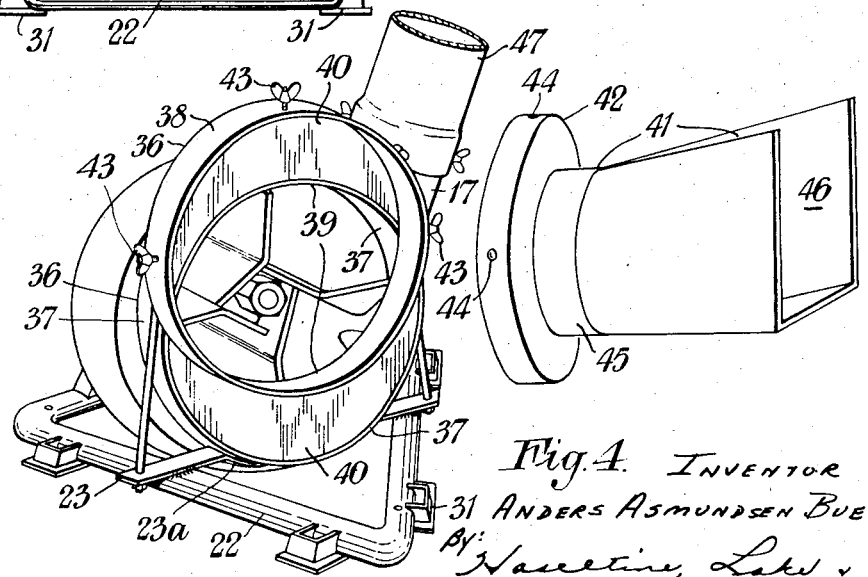
Figure 4 is a rear elevation view.

When it is required to chop up or disintegrate crops having thick stems or roots, e. g. kale or root crops it is preferable to feed the material directly against the edges 15b of the blades 15 so that these edges act upon and break up the material. For this purpose the adapter 36 shown in Figure 4 is fitted over or into the ring or mouth 16 by means of a rear cylindrical ring 37 to which is welded at contacting edge parts an eccentrically related relatively higher similar ring 38, the result being a somewhat oval mouth 39 through which the material passes into the housing 1 at a level above the arcuate plate 20. The spaces between the rings above and below the mouth 39 are closed by crescent shaped plates 40 welded in position. A hopper 41 for feeding the kale or the like into the mouth 39 is provided, and it is plugged by a shallow hollow cylindrical head 42 into the ring 38 and locked by wing head screws 43 threaded through the ring 38 and engaging in dimples 44 in the periphery of the head 42. The hopper body has a substantially horizontal cylindrical neck portion 45 merging into a flared trough-like free end 46 into which the material is fed.

A discharge chimney 47 is detachably clamped on to the outlet 17, and can be composed of a number of tubes detachably connected together to obtain any desired height of discharge and it can have a swan neck or lateral arcuate upper end to discharge the treated material into the top of a hopper.

An advantage of mounting the housing 1 in the manner shown is that it can be adjusted about its axis before clamping it to the base frame, and consequently, if it is desired to hve a forced draught along the chimney 47 in an inclined or horizontal direction, e. g. when feeding forced draught to a grain blower or other apparatus, the unit lends itself readily for such a requirement.

Generally the most effective speed of rotation of the combined beater and fan is 2000 or slightly more revolutions per minute, and a convenient size of machine is about 2 feet 6 inches diameter for the housing 1.

I claim:

1. Apparatus for treating grass, straw, root crops and the like for the preparation of silage comprising a substantially cylindrical housing, a rear wall to said housing, an outlet in its peripheral wall, a conduit from said outlet merging at its inner end into the periphery of the housing, a substantially axial shaft, a journal bearing carried by said rear wall and in which the shaft rotates, a forwardly directed ring-like inlet mouth concentric with said shaft, a number of blades inside said housing and carried by said shaft and each having an axial or fore-and-aft dimension approximately equal to the axial dimension of said housing and a radial dimension nearly equal to the radius of said ring-like mouth, the radius of said mouth only being slightly less than the mean radius of said housing and an arcuate beater plate carried by said mouth and overlapping but slightly spaced radially from said blades, each of said blades for approximately the depth they are overlapped by said beater plate being deformed to form a leading edge inclined relatively to and in advance of the part of the blade in rear of said deformed part so that parts of the blades act as beaters acting on the material as it enters the ring-like mouth whilst the blades act to impel the beaten material entering the housing through said outlet, said deformation of the blades producing a fan-like structure which serves as the medium for creating an induced draught to draw the material into the housing through said ring-like mouth and to beat up the material into flattened strand-like form and eject it from the housing through said outlet in such form.

2. Apparatus according to claim 1, wherein said arcuate plate is secured to the said mouth part in concentric relationship thereof by means affording adjustment of the plate axially and concentrically relative to the mouth part and having rearwardly projecting teeth along its inner edge its adjustment towards and away from the said outlet affording means for controlling the period in which the material takes in passing through the housing.

3. Apparatus according to claim 1, wherein said ring-like mouth is eccentric in relation to the housing.

4. Apparatus according to claim 1, wherein the housing is secured to a horizontal base frame by means affording adjustment of the housing about a horizontal axis relative to the base frame.

5. Apparatus according to claim 1 including a hopper with a circular section neck part readily detachably secured to said mouth part.

6. Apparatus according to claim 1 including an adapter for use in the treatment of kale and root plants and for attachment readily detachable to said mouth part, said adapter comprising a ring shaped for attachment concentrically to the mouth part and partially closed to afford an inlet opening having its lowermost boundary between the axis of the beater shaft and the inner periphery of the mouth part.

7. Apparatus according to claim 6, wherein said means securing the housing to the base frame comprises a split clamp secured to the base frame and passed over the said mouth part, and clamping means secured to the base frame and passed over a sleeve projecting rearwardly from the rear wall of the housing and accommodating journal bearings for the rotary beater shaft.

8. Apparatus according to claim 7 including the relative fixed addition to said adapter ring of another like ring in eccentric and forward relationship to the first mentioned ring and plates, closing the crescent like spaces between the rings, the front ring serving to receive a hopper.

References Cited in the file of this patent

UNITED STATES PATENTS

| | | |
|---|---|---|
| 1,159,822 | Bartholomew | Nov. 9, 1915 |
| 1,558,394 | Rice | Oct. 20, 1925 |
| 1,959,465 | Dryfoos | May 22, 1934 |
| 2,505,023 | Williamson | Apr. 25, 1950 |

FOREIGN PATENTS

| | | |
|---|---|---|
| 262,033 | Great Britain | Nov. 22, 1926 |